J. H. FINCH, Jr.
GASOLENE FILTER.
APPLICATION FILED SEPT. 22, 1913.

1,095,198.

Patented May 5, 1914.

Witnesses
Fenton S. Belt
J. H. Sherwood

Inventor
James H. Finch Jr.
By Franklin H. Hough
Attorney

UNITED STATES PATENT OFFICE.

JAMES H. FINCH, JR., OF QUINCY, MASSACHUSETTS.

GASOLENE-FILTER.

1,095,198.

Specification of Letters Patent.

Patented May 5, 1914.

Application filed September 22, 1913. Serial No. 791,132.

*To all whom it may concern:*

Be it known that I, JAMES H. FINCH, Jr., a citizen of the United States, residing at Quincy, in the county of Norfolk and State of Massachusetts, have invented certain new and useful Improvements in Gasolene-Filters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gasolene filters or purifiers and the object in view is to produce a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1:
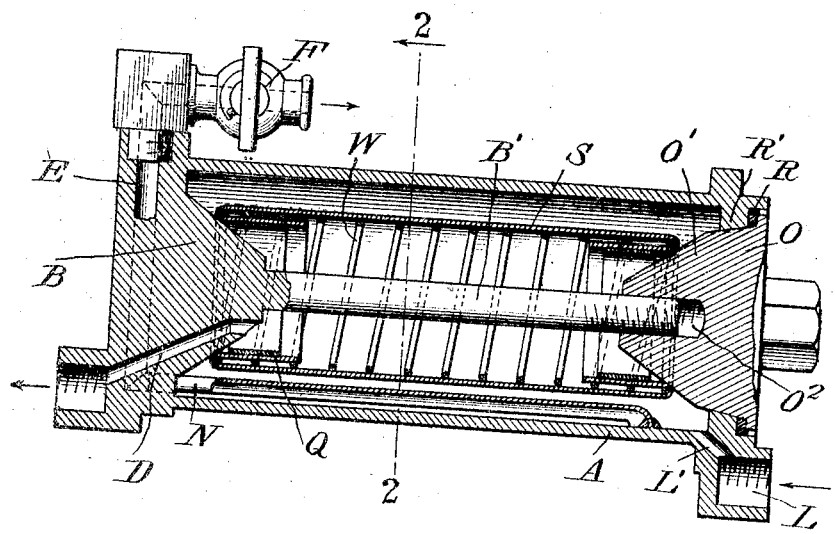
Figure 2:
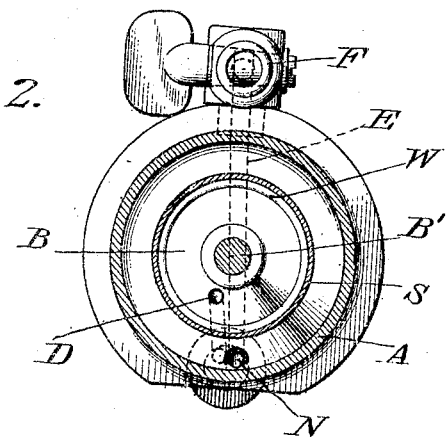

Figure 1 is a central longitudinal sectional view through the filter, and Fig. 2 is a sectional view on line 2—2 of Fig. 1.

Reference now being had to the details of the drawings by letter, A designates a cylinder having a conical shaped projection B extending within the cylinder at one end and which is provided with a duct D leading through the end of the cylinder and to which a pipe, not shown, is adapted to be connected. Said end B is provided with a transverse duct E which communicates with a valved stop cock F, while its other end communicates with a pipe N, open upon its under side. A plug, designated by letter O, has its inner end O' conical shape and has a hole O², the walls of which are threaded for the reception of the threaded end of the pin B' which is integral with the opposite end B. A suitable gasket R is interposed between the flange of the plug O and the annular flange R' which projects from the inner wall of the cylinder. A strainer, designated by letter S and made preferably of chamois, has its ends telescoping therein and a coiled spring W is inserted within said flange and telescopes over the rings Q which tend to hold the inwardly extending ends of the strainer against the coiled spring. Said spring tends to hold the chamois covering, holding the strainer taut, the spring having bearings against the inclined end of the cylinder and the tapering part of the plug. A socket L is formed in the wall of the gasket and to which a pipe is adapted to be connected and from which socket a duct L' leads into the interior of the cylinder and through which the liquid to be filtered is adapted to be passed.

The operation of my device will be readily understood and is as follows:—The gasolene or other liquid to be filtered passes through the duct L into the interior of the cylinder. Any water which may be mixed with the gasolene will settle to the bottom of the cylinder and pass through the pipe N where it may be blown off by opening the stop cock. The pressure upon the oil will cause the same to pass through the chamois strainer and any impurities will fall to the bottom of the tank and be discharged with the water, while the filtered gasolene will pass through the duct D and be piped to any suitable location.

What I claim to be new is:—

1. A gasolene filter comprising a cylinder, an integral pin projecting from the inner end and having a threaded circumference, said end provided with an exit oil duct, a plug fitted within the opposite end of the cylinder and having a threaded opening for the reception of said pin, a coiled spring about said pin, a strainer within the cylinder and held by said spring against the inner end of the cylinder and said plug, said cylinder having in its lower portion a pipe which is open upon its under edge, and a duct leading through the wall of the cylinder and communicating with said pipe, as set forth.

2. A gasolene filter comprising a cylinder having its inner end projecting within the cylinder and provided with a pin with a threaded circumference, said inner end having an oil duct leading thereto, a plug fitted within one end of the cylinder and having a threaded hole for the reception of said pin, a cylindrical shaped chamois filter having inturned ends, a coiled spring mounted within said filter, rings within the inturned ends and adapted to hold the same against said spring, the latter bearing against the inwardly projecting end of the cylinder and said plug, a horizontally disposed pipe within the cylinder at the lower end thereof and open upon its under edge, and a valved duct leading through one end of the cylinder and communicating with said pipe, as set forth.

In testimony whereof I hereunto affix my signature in presence of two witnesses.

JAMES H. FINCH, Jr.

Witnesses:
F. A. SIMMONS,
C. M. HEMENWAY.